United States Patent
Jiang et al.

(10) Patent No.: US 11,310,829 B2
(45) Date of Patent: Apr. 19, 2022

(54) METHOD OF TRANSMITTING INFORMATION IN UNLICENSED BAND AND NETWORK DEVICE

(71) Applicant: VIVO MOBILE COMMUNICATION CO., LTD., Chang'an Dongguan (CN)

(72) Inventors: Lei Jiang, Chang'an Dongguan (CN); Zhi Lu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 83 days.

(21) Appl. No.: 16/625,469

(22) PCT Filed: Jun. 12, 2018

(86) PCT No.: PCT/CN2018/090812
§ 371 (c)(1),
(2) Date: Dec. 20, 2019

(87) PCT Pub. No.: WO2018/233513
PCT Pub. Date: Dec. 27, 2018

(65) Prior Publication Data
US 2021/0153250 A1  May 20, 2021

(30) Foreign Application Priority Data
Jun. 23, 2017  (CN) .................. 201710487447.X (51) Int. Cl.
*H04W 74/08* (2009.01)
*H04L 27/26* (2006.01)
(Continued)

(52) U.S. Cl.
CPC ... *H04W 74/0808* (2013.01); *H04L 27/26025* (2021.01); *H04W 56/001* (2013.01); *H04W 72/0446* (2013.01); *H04W 74/006* (2013.01)

(58) Field of Classification Search
CPC .......... H04W 74/0808; H04W 56/001; H04W 72/0446; H04W 74/006; H04L 27/26025
See application file for complete search history.

(56) References Cited

U.S. PATENT DOCUMENTS

| | | | |
|---|---|---|---|
| 6,215,780 B1 | 4/2001 | Peters et al. | |
| 2009/0067448 A1* | 3/2009 | Stanwood | H04L 12/413 370/447 |

(Continued)

FOREIGN PATENT DOCUMENTS

| | | |
|---|---|---|
| CN | 101047421 A | 10/2007 |
| CN | 101400126 A | 4/2009 |

(Continued)

OTHER PUBLICATIONS

Second Chinese Office Action Application No. 201710487447.X; dated Nov. 15, 2019.
(Continued)

*Primary Examiner* — Brenda H Pham
(74) *Attorney, Agent, or Firm* — von Briesen & Roper, s.c.

(57) ABSTRACT

Provided are a method of transmitting information in an unlicensed band and a network device. The method includes: when there is a synchronized signal block to be transmitted, performing listen before talk (LBT) at an LBT position of a time-domain transmission unit where a candidate transmission position of the synchronized signal block is located, to obtain an LBT result of a channel; if the LBT result of the channel indicates that the channel is idle, then sending, at the candidate transmission position of the synchronized signal block, the corresponding synchronized signal block to UE.

17 Claims, 7 Drawing Sheets

(51) Int. Cl.
*H04W 56/00* (2009.01)
*H04W 72/04* (2009.01)
*H04W 74/00* (2009.01)

(56) References Cited

U.S. PATENT DOCUMENTS

| | | |
|---|---|---|
| 2009/0073915 A1 | 3/2009 | Zhang et al. |
| 2015/0110065 A1* | 4/2015 | Gaal ................. H04W 16/14 370/330 |
| 2015/0110066 A1* | 4/2015 | Gaal ................. H04W 16/14 370/330 |
| 2015/0148053 A1* | 5/2015 | Patel ............... H04W 72/0426 455/452.1 |
| 2015/0334744 A1* | 11/2015 | Ji ..................... H04W 74/085 370/336 |
| 2016/0309334 A1 | 10/2016 | Bhorkar et al. |
| 2017/0171759 A1 | 6/2017 | Li et al. |
| 2017/0280331 A1 | 9/2017 | Guo et al. |
| 2018/0007708 A1 | 1/2018 | Ke et al. |
| 2018/0115983 A1 | 4/2018 | Harada et al. |
| 2018/0191547 A1* | 7/2018 | Mukherjee ........ H04W 72/0446 |
| 2020/0296765 A1* | 9/2020 | Kim ................. H04W 74/0833 |
| 2021/0144601 A1* | 5/2021 | Kazmi ............. H04W 36/0058 |

FOREIGN PATENT DOCUMENTS

| | | |
|---|---|---|
| CN | 104333873 A | 2/2015 |
| CN | 104333902 A | 2/2015 |
| CN | 104507108 A | 4/2015 |
| CN | 105162562 A | 12/2015 |
| CN | 105577339 A | 5/2016 |
| CN | 105991211 A | 10/2016 |
| CN | 106160982 A | 11/2016 |
| CN | 106162658 A | 11/2016 |
| EP | 3139691 A1 | 3/2017 |
| WO | WO 2016/072218 A1 | 5/2016 |

OTHER PUBLICATIONS

Chinese Search Report Application No. 201710487447.X; dated Apr. 17, 2019.

European Search Report Application No. 18820586.8; dated May 13, 2020.

International Search Report & Written Opinion related to Application No. PCT/CN2018/090812; dated Aug. 16, 2018.

PCT/CN2018/090812; reported on Aug. 16, 2018.

* cited by examiner

| Detecting periodically a synchronized signal block transmitted by the network device at a candidate transmission position of the synchronized signal block in the time domain transmission unit | ~191 |

METHOD OF TRANSMITTING INFORMATION IN UNLICENSED BAND AND NETWORK DEVICE

CROSS-REFERENCE TO RELATED APPLICATION

This patent application is a 35 USC § 371 U.S. national stage of International Application No. PCT/CN2018/090812 filed on Jun. 12, 2018, which claims a priority to Chinese Patent Application No. 201710487447.X filed with the Chinese Patent Office on Jun. 23, 2017, which are incorporated by reference herein.

TECHNICAL FIELD

The present disclosure relates to the field of communication technologies, in particular to a method of transmitting information in an unlicensed band and a network device.

BACKGROUND

In future communication systems, the unlicensed band may be used as a supplement to the licensed band to help operators to expand capacity. The unlicensed band may occupy the 5 GHz, 37 GHz, and 60 GHz bands to keep deployment in the New Radio (NR) system consistent and to maximize unlicensed access based on the NR system. Although a large bandwidth (80 MHz or 100 MHz) of the unlicensed band may reduce the implementation complexity of a base station and user equipment (UE), due to the fact that the unlicensed band is shared by a plurality of radio access technologies (RATs), for example, the wireless fidelity (WiFi), the radar, the long term evolution license assisted access (LTE-LAA), etc., certain regulations, such as listen before talk (LBT) or maximum channel occupancy time (MCOT), must be met when the unlicensed band is used, to ensure that all devices may use the resource fairly.

In the 5th Generation (5G) mobile communication system, or the NR system, for the purpose of initial access, or radio resource management (RRM) measurement, etc., the network device is required to send a synchronized signal block (SS Block), such that UE may perform measurement, evaluation and the like based thereon. The synchronized signal block is composed of a New Radio primary synchronized signal (NR-PSS) and a New Radio secondary synchronized signal (NR-SSS) and a New Radio physical broadcast channel (NR-PBCH) signal, and is sent periodically. For the UE in a connected state, an idle state, and a non-standalone state, the network device may configure a transmission period of the synchronized signal block to be 5 milliseconds (ms), 10 ms, 20 ms, 40 ms, 80 ms, or 160 ms. Regardless of the period, the synchronized signal block should be completed in a window of 5 ms.

As far as the licensed band is concerned, the network device may periodically send the synchronized signal block; while for the unlicensed band, since the unlicensed band is shared by a plurality of access technologies and the contention-based access mode leads to uncertainty in channel available time, the transmission of the synchronized signal block may no longer be guaranteed. Therefore, the mechanism of periodically sending the synchronized signal block is no longer applicable.

SUMMARY

Embodiments of the present disclosure provide a method of transmitting information in an unlicensed band and a network device.

In a first aspect, an embodiment of the present disclosure provides a method of transmitting information in an unlicensed band. The method is applied to a network device side and includes: when there is a synchronized signal block to be transmitted, performing LBT at an LBT position of a time domain transmission unit where a candidate transmission position of the synchronized signal block is located, to obtain an LBT result of a channel; and sending, at the candidate transmission position of the synchronized signal block, the corresponding synchronized signal block to UE if the LBT result of the channel indicates that the channel is idle.

In a second aspect, an embodiment of the present disclosure further provides a network device. The network device includes: an LBT module, configured to, when there is a synchronized signal block to be transmitted, perform LBT at an LBT position of a time domain transmission unit where a candidate transmission position of the synchronized signal block is located, to obtain an LBT result of a channel; and a first sending module, configured to send, at the candidate transmission position of the synchronized signal block, the corresponding synchronized signal block to UE if the LBT result of the channel indicates that the channel is idle.

In a third aspect, an embodiment of the present disclosure provides a network device. The network device includes a processor, a storage and a computer program stored in the storage and executable by the processor, where the processor is configured to execute the computer program, to implement steps of the foregoing method of transmitting information in an unlicensed band.

In a fourth aspect, an embodiment of the present disclosure provides a computer readable storage medium storing therein a computer program, where the computer program is configured to be executed by a processor, to implement steps of the foregoing method of transmitting information in an unlicensed band.

BRIEF DESCRIPTION OF THE DRAWINGS

In order to more clearly illustrate the technical solutions of the embodiments of the present disclosure, the drawings required for the description of the embodiments of the present disclosure will be briefly described below. It is obvious that the drawings in the following description illustrate only some embodiments of the present disclosure. Other drawings may also be obtained by those of ordinary skill in the art based on these drawings without any creative effort.

DETAILED DESCRIPTION

Exemplary embodiments of the present disclosure will be described in more detail below with reference to the accompanying drawings. Although the exemplary embodiments of the present disclosure are shown in the drawings, it should be understood that the disclosure may be embodied in various forms and is not limited by the embodiments set forth herein. Rather, these embodiments are provided so that this disclosure will be more fully understood and the scope of the disclosure will be fully conveyed to those skilled in the art.

The terms "first", "second" and the like in the specification and claims of the present application are used to distinguish similar objects, and are not necessarily used to describe a particular order or sequence. It is to be understood that the data used in this way may be interchanged under appropriate circumstances, such that the described embodiments of the present application may for example be implemented in other orders than those described or illustrated herein. In addition, the terms "comprise" and "have" and any variants thereof are intended to cover non-exclusive inclusions, for example, a process, method, system, product, or device that includes a series of steps or units is not necessarily limited to those steps or units clearly listed, but may include other steps or units not explicitly listed or inherent to such process, method, product or device.

Embodiments of the present disclosure provide a method of transmitting information in an unlicensed band and a network device, to solve the problem of sending a synchronized signal block in an unlicensed band in a communication system. The following embodiment uses an NR system as an example. It will be understood by those skilled in the art that the NR system is merely an example and does not constitute a limitation of the present disclosure.

Figure 1:
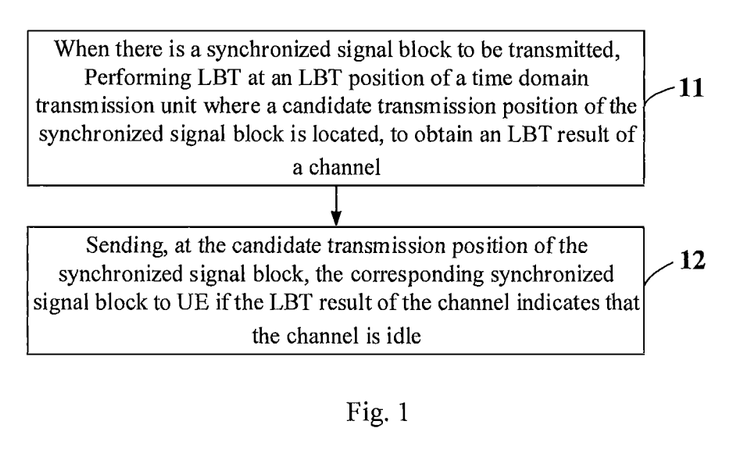
FIG. 1 is a schematic flow diagram illustrating a method of transmitting information in an unlicensed band on a network device side according to an embodiment of the present disclosure.

An embodiment of the present disclosure provides a method of transmitting information in an unlicensed band, which is applied to a network device side. As shown in FIG. 1, the method specifically includes step 11 to step 12.

The step 11 includes: when there is a synchronized signal block to be transmitted, performing LBT at an LBT position of a time domain transmission unit where a candidate transmission position of the synchronized signal block is located, to obtain an LBT result of a channel.

In a New Radio license assisted access (NR-LAA) system, when a network device is to send downlink information to UE, it is necessary for the network device to listen before talk, that is, it is necessary to listen to an unlicensed band channel including a candidate transmission position of a synchronized signal block (SS Block), to determine the channel state of the corresponding unlicensed band channel. The LBT position includes: a first LBT position starting from the start of the time domain transmission unit where the candidate transmission position of the synchronized signal block is located, or a second LBT position ending at the end of a time domain transmission unit previous to the time domain transmission unit where the candidate transmission position of the synchronized signal block is located. It should be noted that, the first LBT position and the second LBT position refer to a certain range of time domain resources. For example, the first LBT position is the first several time domain symbols or first several microseconds of the time domain transmission unit; the second LBT position is the last several time domain symbols or last several microseconds of the previous time domain transmission unit.

Specifically, there are multiple candidate transmission positions of the synchronized signal block, and there may be multiple candidate transmission positions of the synchronized signal block in a time window of 5 ms. The network device listens to the channel at each candidate transmission position until the LBT result indicates that the channel state is idle and the synchronized signal block is successfully sent. If the network device fails to transmit within a window of 5 ms, for a synchronized signal block transmission period greater than or equal to 20 ms, the network device listens to the channel within a time window of 5 ms based on a period of 20 ms until the synchronized signal block is successfully sent. For a synchronized signal block transmission period of 5 ms or 10 ms, the network device listens to the channel within a window of 5 ms based on the corresponding period, and sends the synchronized signal block according to the channel state.

The step 12 includes: sending, at the candidate transmission position of the synchronized signal block, the corresponding synchronized signal block to UE if the LBT result of the channel indicates that the channel is idle.

When the channel state is detected as idle by performing LBT at the time domain transmission unit where the candidate position of the synchronized signal block is located, it is determined that the time domain transmission unit is available. When the channel is available, the corresponding synchronized signal block is sent, to solve the problem of the transmission of the synchronized signal block caused by the uncertain available time of the unlicensed band channel, so that a smooth performance of processes such as the initial access of UE and the RRM measurement is ensured.

Further, it takes a certain transient period for the network device to switch from the LBT state to the transmission state. Thus, the step 12 specifically includes: if the LBT result of the channel indicates that the channel is idle, sending, at the candidate transmission position of the synchronized signal block, the corresponding synchronized signal block to the UE after a preset transient period. The preset transient period is to ensure that the network device may be properly switched into the transmission state, to enable proper transmission of the synchronized signal block. Generally, when the subcarrier spacing of the synchronized signal block is small (for example, 15 KHz), there is sufficient remaining time at the LBT position for the network device to switch from the LBT state to the transmission state; as a result, special transient time may not be reserved. That is, the network device is able to complete the LBT and switch processes at the LBT position. When the subcarrier spacing is large (for example, greater than or equal to 30 KHz), there may insufficient remaining time at the LBT position for the network device to switch from the LBT state to the transmission state, so a special preset transient period should be reserved, to ensure that the network device may be properly switched into the transmission state, thereby achieving proper transmission of the synchronized signal block.

It should be noted that, when the first LBT position is the first M microseconds of the time domain transmission unit where the candidate transmission position of the synchronized signal block is located, and the second LBT position is the last N microseconds of the previous time domain transmission unit, the step 11 specifically includes: performing LBT at first M microseconds of the time domain transmission unit where a candidate transmission position of the synchronized signal block is located or at last N microseconds of a previous time domain transmission unit, to obtain the LBT result of the channel; the M and the N are positive integers.

Optionally, values of the M and the N are 16 or 25. That is, the LBT is performed at the start of the time domain transmission unit or at the end of the previous time domain transmission unit, with each LBT lasting for 16 microseconds or 25 microseconds. For synchronized signal blocks with small subcarrier spacing (such as 15 KHz), the LBT may last for 25 microseconds. For synchronized signal blocks with subcarrier spacing greater than 15 KHz, the LBT time may be appropriately shortened, for instance the LBT may last for 16 microseconds.

Further, when the first LBT position is the first P time domain symbols of the time domain transmission unit where the candidate transmission position of the synchronized signal block is located, and the second LBT position is the last Q time domain symbols of the previous time domain transmission unit, the step 11 specifically includes: performing LBT at first P time domain symbols of the time domain transmission unit where a candidate transmission position of the synchronized signal block is located or at last Q time domain symbols of a previous time domain transmission unit, to obtain the LBT result of the channel; where the P and the Q are positive integers.

Optionally, when the subcarrier spacing corresponding to the synchronized signal block is 15 KHz, values of P and Q are 1; when the subcarrier spacing corresponding to the synchronized signal block is 30 KHz, the values of P and Q are greater than or equal to 2; when the subcarrier spacing corresponding to the synchronized signal block is 120 KHz, the values of P and Q are greater than or equal to 3; when the subcarrier spacing corresponding to the synchronized signal block is 240 KHz, the values of P and Q are greater than or equal to 6.

It should be noted that, besides the subcarrier spacing, the selection of values of P and Q may be further related to the length of the above-mentioned LBT time. The values of P and Q listed above are directed to scenarios where the LBT time is 25 microseconds. In the scenarios where the LBT time is 16 microseconds, the values of P and Q corresponding to the different subcarrier spacings differ from the above optional values.

Further, the above shows that there are multiple candidate transmission positions of the synchronized signal block. When there is a transmission position of a physical downlink control channel (PDCCH) in the time domain transmission unit where the candidate transmission position of the synchronized signal block is located, since the PDCCH starts from the start of each time domain transmission unit, accordingly, the candidate transmission position of the synchronized signal block is located after the reserved transmission position of the physical downlink control channel, and the candidate transmission position includes: one or more consecutive transmission positions, other than the reserved transmission position of the physical downlink control channel, within a current time domain transmission unit.

When there is PDCCH in the time domain transmission unit, however there is no downlink control information to be sent by the network device, it is necessary to occupy the time domain transmission unit. Therefore, after the LBT result indicates that the channel state is idle, the method further includes: sending a channel reservation signal to the UE at the reserved transmission position of the physical downlink control channel. In other words, even if there is no downlink control information to be sent by the network device, it is still necessary to send a channel reservation signal at the reserved transmission position of the PDCCH to occupy the corresponding time domain transmission unit, thereby ensuring proper transmission of the synchronized signal block at the reserved transmission position.

Further, when there is no candidate transmission position of the PDCCH in the time domain transmission unit where the candidate transmission position of the synchronized signal block is located, each candidate transmission position of the synchronized signal block includes: one or more consecutive transmission positions, other than the LBT position, in the time domain transmission unit. To ensure the continuous transmission of the synchronized signal block, each candidate transmission position includes a plurality of consecutive transmission positions.

Further, since there are multiple candidate transmission positions of the synchronized signal block, that is, time domain transmission unit includes at least two candidate transmission positions of the synchronized signal block, the multiple candidate transmission positions of the synchronized signal block may be consecutive or non-consecutive. When there is other transmission position between two candidate transmission positions in the time domain transmission unit, in order to ensure that the network device continues occupying the channel, the method of the embodiment of the present disclosure further includes: sending a channel reservation signal to the UE at the other transmission position between the two candidate transmission positions, to achieve continuous occupation of the channel.

The time domain transmission unit includes: 1 slot, 2 slots or 1 millisecond. The scenarios with different ranges of the time domain transmission unit will be described in detail below with reference to the accompanying drawings.

The First Scenario

For the synchronized signal block with a subcarrier spacing of 15 KHz, 30 KHz or 120 KHz, the network device may perform listen before talk (LBT) for each slot, and determine, based on the listened channel state, whether to transmit the synchronized signal block in the slot. The time domain transmission unit is 1 slot, and each slot includes 7 or 14 time domain symbols. In the present embodiment, only a scenario in which each slot includes 14 time domain symbols is illustrated. A scenario in which each slot includes 7 time domain symbols may also be implemented in a similar manner, and therefore will not be described again.

Figure 2:
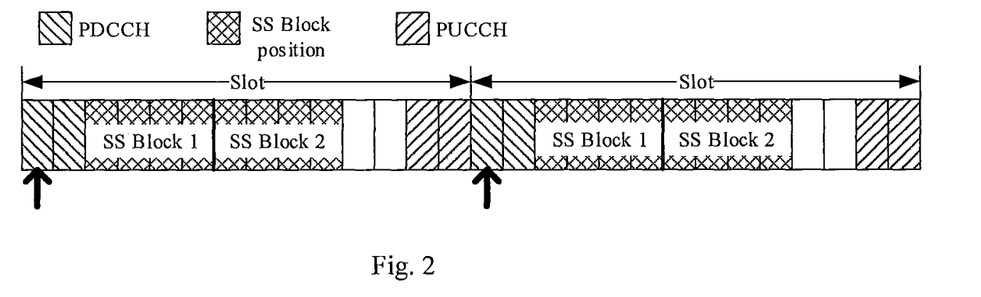
FIG. 2 to FIG. 7 are schematic diagrams illustrating resource reservation of a time domain transmission unit in a first scenario according to an embodiment of the present disclosure.
Figure 3:
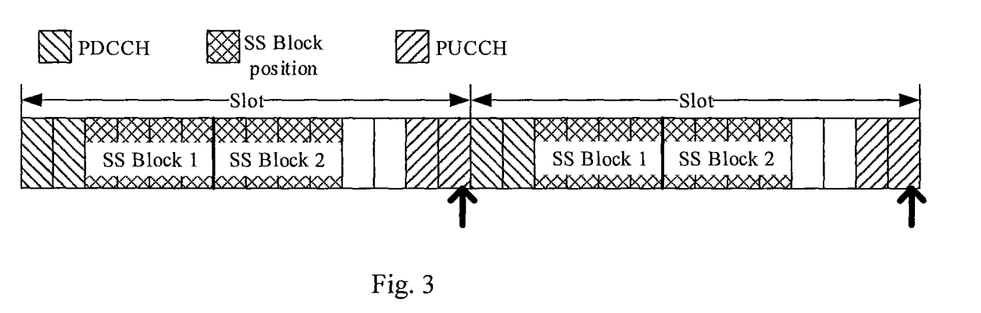

Specifically, taking 15 KHz as an example, as shown in FIG. 2, the network device listens at the initial time domain symbol (the first symbol pointed to by the arrow in the figure) of the current slot (or referred to as LBT). If the LBT result indicates that the channel state is idle, then the downlink control information is transmitted at the reserved position of the physical downlink control channel (the reserved position of the PDCCH is generally the initial transmission position of each slot), and the transmission of the synchronized signal block is performed at the reserved transmission positions of the synchronized signal block (the SS Block 1 and the SS Block 2 as shown in the figure). As shown in FIG. 3, the network device may also perform LBT at the ending time domain symbol (the last symbol pointed to by the arrow as shown in the figure) of a slot previous to the current slot, and if the LBT result indicates that the channel state is idle, then the downlink control information is transmitted at the reserved position of the physical downlink control channel (the reserved position of the PDCCH is generally the initial transmission position of each slot), and the transmission of the synchronized signal block is performed at the reserved transmission positions of the synchronized signal block (the SS Block 1 and the SS Block 2 as shown in the figure). It should be noted that the synchronized signal block (SS Block) should be continuously transmitted as much as possible to avoid unnecessary insertion of a channel reservation signal; further, if there is no downlink control information to be transmitted, the channel reservation signal may be transmitted at the transmission position (time domain symbol) originally reserved for the PDCCH. Further, If transition between uplink and downlink are allowed in one slot, the network device reserves time domain symbols acting as a guard period (GP) for the transition between uplink and downlink and time domain symbols for the physical uplink control channel (PUCCH) used for transmitting uplink control information. The time domain symbols between the reserved transmission position corresponding to the uplink transmission and the reserved transmission position of the synchronized signal block may be used to transmit data or channel reservation signals. If no transition between uplink and downlink is performed in one slot, the network device does not perform other processing at the remaining transmission positions after transmitting the synchronized signal block.

Further, taking 30 KHz as an example, the network device listens at the initial two time domain symbols (the first and the second symbol) of the current slot (or also referred to as LBT). If the LBT result indicates that the channel state is idle, the downlink control information is transmitted at the reserved position of the physical downlink control channel (the reserved position of the PDCCH is generally the initial transmission position of each slot), and the transmission of the synchronized signal block is performed at the reserved transmission position of the synchronized signal block. In addition, the network device may listen at two ending time domain symbols (the last two symbols) of a slot previous to the current slot (or also referred to as LBT). If the LBT result indicates that the channel state is idle, the downlink control information is transmitted at the reserved position of the physical downlink control channel (the reserved position of the PDCCH is generally the initial transmission position of each slot), and the transmission of the synchronized signal block is performed at the reserved transmission position of the synchronized signal block. It should be noted that, after the LBT result indicates that the channel state is idle, the network device may switch from the LBT state to the transmission state within the preset transient period, thereby ensuring the proper transmission of the synchronized signal block.

Figure 4:
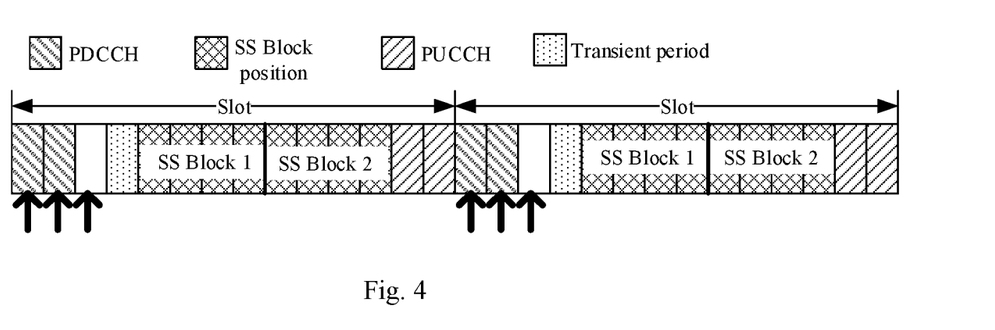
Figure 5:
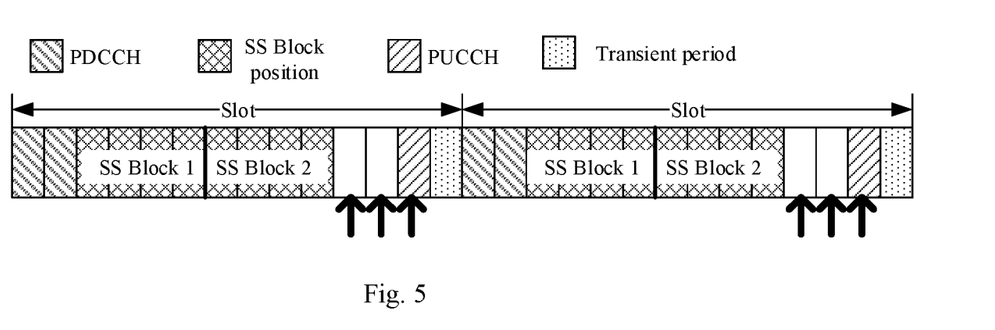

Further, taking 120 KHz as an example, as shown in FIG. 4, the network device listens at the initial three time domain symbols (the three symbols pointed to by the arrows as shown in figure) of the current slot (or also referred to as LBT). If the LBT result indicates that the channel state is idle, then the downlink control information is transmitted at the reserved position of the physical downlink control channel (the reserved position of the PDCCH is generally the initial transmission position of each slot), and the synchronized signal block is transmitted at the reserved transmission positions of the synchronized signal block (the SS Block 1 and the SS Block 2 as shown in the figure). As shown in FIG. 5, the network device may also listen at the three ending time domain symbols (the three symbols pointed to by the arrows in the figure) of the slot previous to the current slot (or referred to as LBT). If the LBT result indicates that the channel state is idle, then the downlink control information is transmitted at the reserved position of the physical downlink control channel (the reserved position of the PDCCH is generally the initial transmission position of each slot), and the synchronized signal block is transmitted at the reserved transmission positions of the synchronized signal block (the SS Block 1 and the SS Block 2 as shown in the figure). It should be noted that, since it takes certain transient period for the network device to switch from the LBT state to the transmission state, for a large subcarrier spacing (such as above 120 KHz), the remaining time at the LBT position may be insufficient for the switch, therefore the network device may need to reserve additional time domain symbols as transient period of the network device. As shown in FIG. 4 and FIG. 5, one time domain symbol is reserved as the transient period of the network device (as shown in figure). Therefore, a number of time domain symbols actually required by the network device, before the synchronized signal block is sent, depends on the maximum transient period of the network device and the subcarrier spacing of the synchronized signal block.

Figure 6:
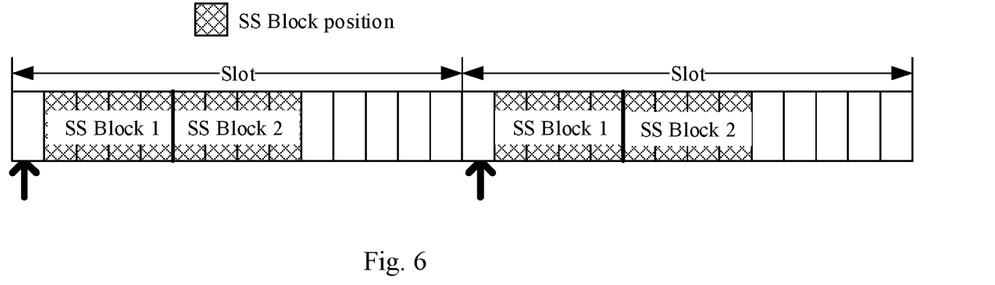
Figure 7:
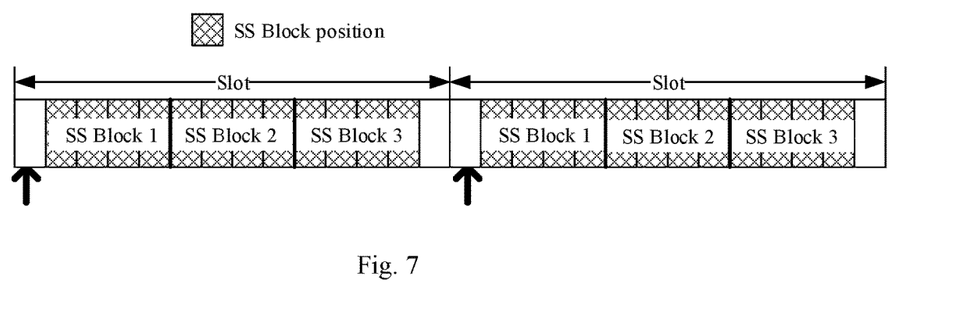

Further, if there is no downlink control information or uplink control information to be transmitted in the current transmission time domain unit, all transmission positions may be reserved for the synchronized signal block, as shown in FIG. 6 and FIG. 7. The subcarrier spacing of the synchronized signal block is 15 KHz. The LBT position is the initial time domain symbol (the first symbol pointed to by the arrow in the figure). There may be two reserved transmission positions reserved for the synchronized signal block in one slot (as shown in FIG. 6), or the number of reserved transmission positions reserved for the synchronized signal block is not limited to two (three in the figure). The synchronized signal block is transmitted at these reserved transmission positions, so that the UE may detect the synchronized signal block at these positions.

The Second Scenario

For a synchronized signal block with a subcarrier spacing of 240 kHz, the network device may perform LBT for every two adjacent slots, and then determine whether to transmit the synchronized signal block in the two slots according to the listened channel state. The time domain transmission unit is 2 slots, and each slot includes 14 time domain symbols. Further, number of time domain symbols used for LBT depends on the duration of the LBT (such as 25 us or 16 us) or the subcarrier spacing. For a synchronized signal block with a subcarrier spacing of 240 KHz, if the LBT lasts for 25 us, then the network device reserves at least 6 time domain symbols for LBT. In addition, it takes a certain transient period for the network device to switch from the LBT state to the transmission state. For a large subcarrier spacing, the remaining time at the LBT position may be insufficient for the switch, therefore the network device may need to reserve additional time domain symbols as transient period. For example, two time domain symbols are reserved as the transient period.

Figure 8:
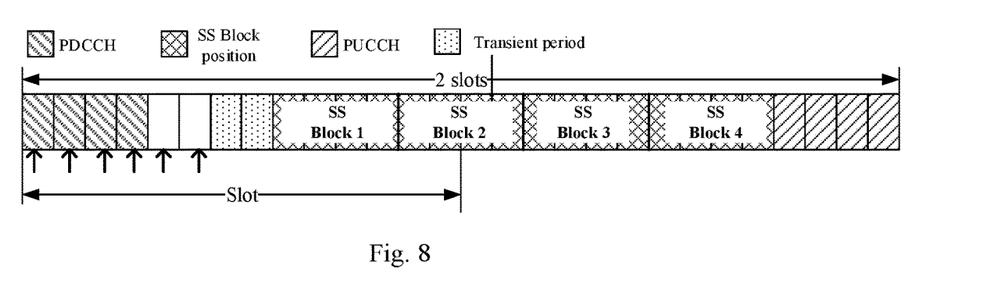
FIG. 8 to FIG. 10 are schematic diagrams illustrating resource reservation of a time domain transmission unit in a second scenario according to an embodiment of the present disclosure.
Figure 9:
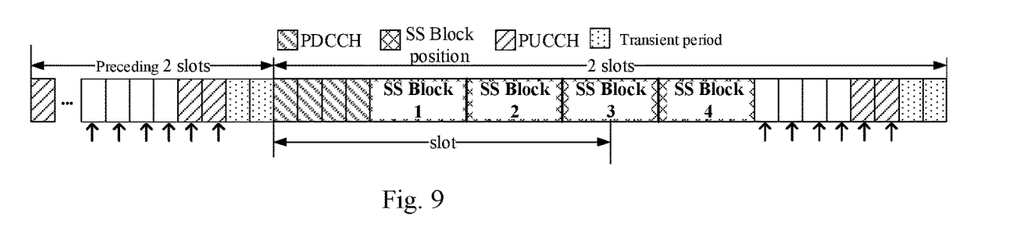
Figure 10:
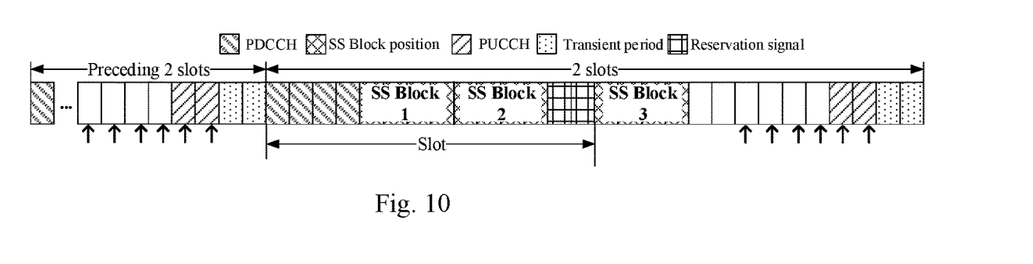

Specifically, as shown in FIG. 8, the network device listens at the initial 6 time domain symbols (the first to the sixth symbol pointed to by the arrows as shown in the figure)

of the two slots (also referred to as LBT). If the LBT result indicates that the channel state is idle, the transition between the LBT state and the transmission state is performed during the transient period, and the synchronized signal block is transmitted at the reserved transmission positions (the SS Block 1, the SS Block 2, the SS Block 3 and the SS Block 4 as shown in the figure) of the synchronized signal block. As shown in FIG. 9, the network device may also perform LBT at the last several time domain symbols (the first 6 symbols among last 8 symbols that are pointed to by the arrows as shown in the figure) of a slot previous to the two slots. If the LBT result indicates that the channel state is idle, the synchronized signal block is transmitted at the reserved transmission positions (the SS Block 1, the SS Block 2, the SS Block 3 and the SS Block 4 as shown in the figure) of the synchronized signal block. It should be noted that, when two slots are used as a time domain transmission unit, the synchronized signal block may be transmitted across slots (as shown in FIG. 8 and FIG. 9), and the SS Block 1, the SS Block 2, the SS Block 3 and the SS Block 4 are continuous. The SS Block 3 occupies the last two time domain symbols of the first slot and the first two time domain symbols of the second slot respectively. Correspondingly, as shown in FIG. 10, when two slots are used as a time domain transmission unit, the synchronized signal block may not be transmitted across slots. The SS Block 1 and the SS Block 2 are reserved in the first slot, and the remaining time domain symbols are insufficient to transmit one synchronized signal block. At this time, the network device transmits the channel reservation signal at the remaining time domain symbols and transmits the synchronized signal block in the SS Block 3 reserved in the second slot.

The above briefly describes the different scenarios from the perspective of the subcarrier spacing of the synchronized signal block. The following third scenario will be further introduced from the perspective of the transmission time of the synchronized signal block.

The Third Scenario

When the time domain transmission unit is 1 ms, that is, when the transmission time for the synchronized signal block is 1 ms, the network device may listen at the 1 ms (or referred to as LBT), and determine whether to transmit the synchronized signal block in the slot according to the listened channel state. When the subcarrier spacing of the synchronized signal block varies, the number of slots corresponding to the time domain transmission unit may vary, and each slot includes 7 or 14 time domain symbols. In the present embodiment, only a scenario in which each slot includes 14 time domain symbols is illustrated.

Further, the network device performs LBT at the initial one or more time domain symbols of the first slot within the 1 ms, or, the network device performs LBT at the last one or more time domain symbols of the last slot of 1 ms previous to the 1 ms. If the LBT result indicates that the channel state is idle, the synchronized signal block is transmitted at the reserved transmission position of the synchronized signal block.

Figure 11:
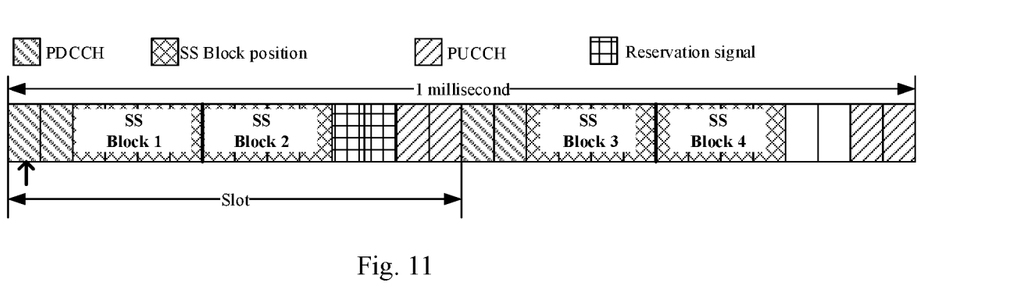
FIG. 11 to FIG. 15 are schematic diagrams illustrating resource reservation of a time domain transmission unit in a third scenario according to an embodiment of the present disclosure.
Figure 12:
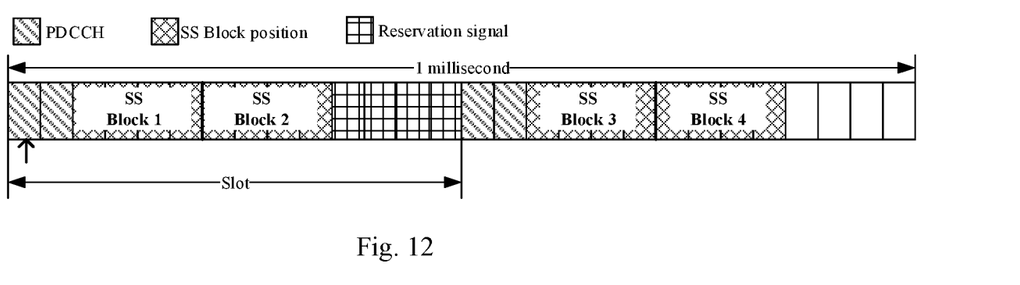
Figure 13:
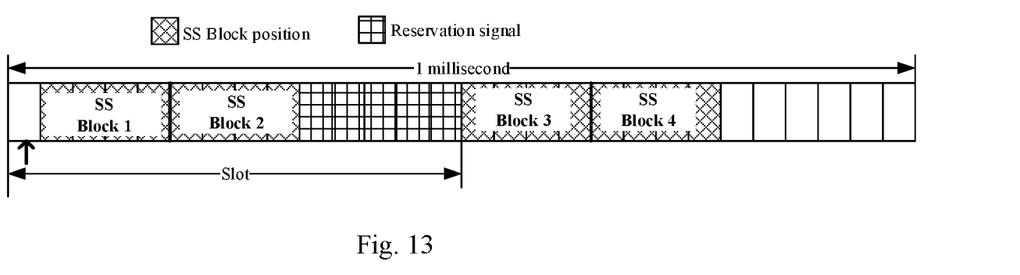

Specifically, taking 30 KHz as an example, the network device performs LBT at the initial time domain symbol (the first symbol) of the first slot of the 1 ms. This 1 ms includes two slots, as shown in FIG. 11, a PUCCH and a PDCCH are reserved in each slot, a SS Block 1 and a SS Block 2 are reserved in the first slot of this 1 ms, a SS Block 3 and a SS Block 4 are reserved in the second slot of this 1 ms, and the network device transmits a channel reservation signal at transmission positions in the first slot other than the reserved transmission positions of the PUCCH, PDCCH, and SS Blocks. As shown in FIG. 12, PDCCH is reserved in each slot, a SS Block 1 and a SS Block 2 are reserved in the first slot of this 1 ms, a SS Block 3 and a SS Block 4 are reserved in the second slot of this 1 ms, and the network device transmits a channel reservation signal at transmission positions in the first slot other than the reserved transmission positions of the PDCCH and SS Blocks. Further, if there is no downlink control information to be transmitted, a channel reservation signal may be transmitted at the transmission position (the time domain symbol) originally reserved for the PDCCH. As shown in FIG. 13, no control channel is reserved in each slot, a SS Block 1 and a SS Block 2 are reserved in the first slot of this 1 ms, a SS Block 3 and a SS Block 4 are reserved in the second slot of this 1 ms, and the network device transmits a channel reservation signal at transmission positions in the first slot other than the reserved transmission positions of the SS Blocks.

In the above description, two reserved transmission positions are reserved in one slot for synchronized signal block. The following describes a scenario in which the number of reserved transmission positions reserved in one slot for synchronized signal block is not limited to two.

Figure 14:
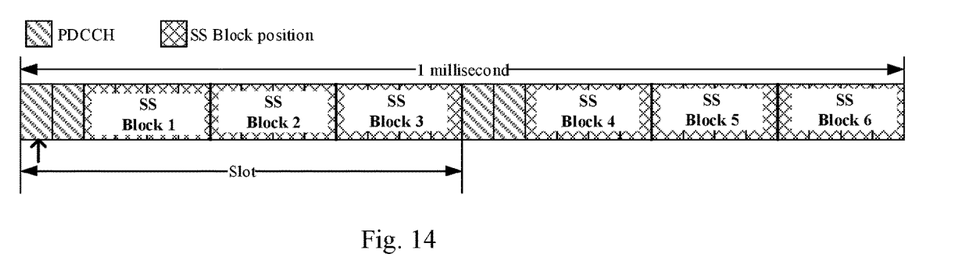
Figure 15:
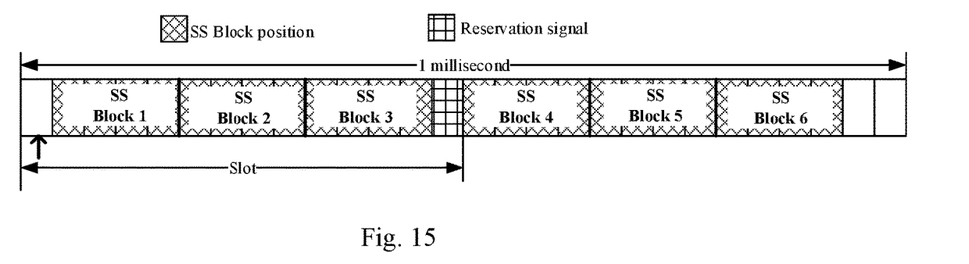

Specifically, as shown in FIG. 14, the PDCCH is reserved in each slot, a SS Block 1, a SS Block 2 and a SS Block 3 are reserved in the first slot of this 1 ms, a SS Block 4, a SS Block 5 and a SS Block 6 are reserved in the second slot of this 1 ms, there are no other transmission positions within this 1 ms apart from the reserved transmission positions of the PDCCH and SS Blocks. Further, if there is no downlink control information to be transmitted, a channel reservation signal may be transmitted at the transmission position (the time domain symbol) originally reserved for the PDCCH. As shown in FIG. 15, no control channel is reserved in each slot, a SS Block 1, a SS Block 2 and a SS Block 3 are reserved in the first slot of this 1 ms, a SS Block 4, a SS Block 5 and a SS Block 6 are reserved in the second slot, and the network device transmits a channel reservation signal at transmission positions in the first slot other than the reserved transmission positions of the SS Blocks.

Further, it should be noted that, when the subcarrier spacing of the synchronized signal block is 120 KHz or 240 KHz, there are more slots in each 1 ms. However, the transmission method is similar to the case of 30 kHz in the above third scenario, and therefore will not be described herein.

The above describes the scenario in which the numerology (especially the subcarrier spacing) of the synchronized signal block is different from the numerology of other data. The scenario in which the synchronized signal block and other data are provided with identical numerologies will be further described hereinafter with reference to the accompanying drawings.

The Fourth Scenario

Figure 16:
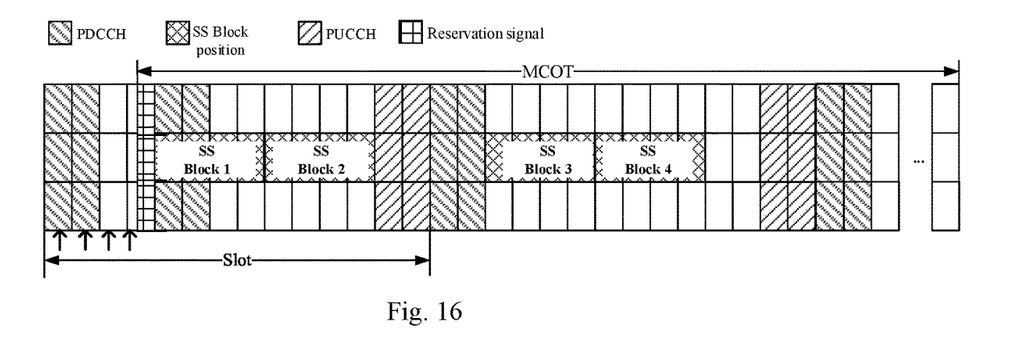
FIG. 16 is a schematic diagram illustrating resource reservation of a time domain transmission unit in a fourth scenario according to an embodiment of an present disclosure.

When the subcarrier spacing of the synchronized signal block is the same as the subcarrier spacing of other data, the LBT may be performed across the entire bandwidth. When the LBT result indicates that the channel state is idle, the downlink control information is transmitted at a reserved transmission position of the physical downlink control channel, the synchronized signal block is transmitted at a reserved transmission position of the synchronized signal block, and uplink control information is transmitted at a reserved transmission position of a physical uplink control channel, and so on. Specifically, the LBT process may be performed according to the channel access procedure of PDCCH/physical downlink shared channel (PDSCH)/enhanced physical downlink control channel (EPDCCH) in the LTE LAA system. As shown in FIG. 16, the network device performs LBT for the channel state at an LBT position (the first 4 symbols pointed to by the arrows as shown in figure). When the LBT result indicates that the channel state is idle, the channel is occupied; as shown in the figure, when the network device performs LBT at the fourth symbol and the LBT result indicates that the channel state is idle, the network device sends a channel reservation signal to occupy the channel. Within the maximum channel occupancy time (MCOT), the network device sends a synchronized signal block at the reserved transmission positions (a SS Block 1 and a SS Block 2 in the first slot, a SS Block 3 and a SS Block 4 in the second slot, as shown in the figure) of the synchronized signal block. If transmission of the synchronized signal block is completed, that is, assuming that the transmission of synchronized signal block is completed in the SS Block 1 and the SS Block 2, the transmission resources reserved for the synchronized signal block in the remaining slots may be used to send data, that is, the remaining SS Block 3 and SS Block 4 may be used to send data. If there is no control information or synchronized signal block to be transmitted when the LBT result indicates that the channel state is idle, the network device sends a channel reservation signal at the corresponding transmission position. It should be noted that, since the network device performs LBT across the entire bandwidth in the scenario, an information transmission scenario of the bandwidth part corresponding to the synchronized signal block is set forth above, and the other bandwidth part may be used for transmitting data.

In the method of transmitting information in the unlicensed band according to the embodiment of the present disclosure, the network device performs LBT at the time domain transmission unit where a candidate transmission position of the synchronized signal block is located, to determine whether the time domain transmission unit is available, and the corresponding synchronized signal block is sent when the channel is available, to solve the problem of transmission of the synchronized signal block caused by the uncertain available time of the unlicensed band channel, so that a smooth performance of processes such as the initial access of UE and the RRM measurement is ensured.

The above embodiments describe the method of transmitting information in the unlicensed band in different scenarios respectively. The following embodiments further describe the corresponding network devices with reference to the accompanying drawings.

Figure 17:
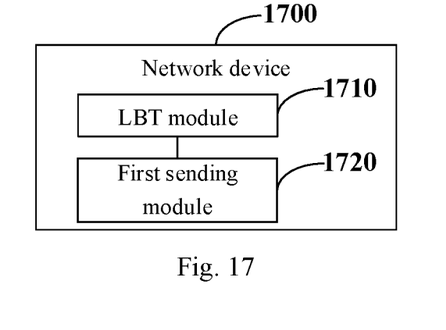
FIG. 17 is a schematic modular diagram of a network device according to an embodiment of the present disclosure.

As shown in FIG. 17, the network device 1700 according to the embodiment of the present disclosure may implement the detail of the method according to the foregoing embodiment of when there is a synchronized signal block to be transmitted, performing LBT at an LBT position of a time domain transmission unit where a candidate transmission position of the synchronized signal block is located, to obtain an LBT result of a channel, and sending, at the candidate transmission position of the synchronized signal block, the corresponding synchronized signal block to UE if the LBT result of the channel indicates that the channel is idle, and may achieve the same effect. The network device 1700 specifically includes the following functional modules: an LBT module 1710, which is configured to, when there is a synchronized signal block to be transmitted, perform LBT at an LBT position of a time domain transmission unit where a candidate transmission position of the synchronized signal block is located, to obtain an LBT result of a channel; a first sending module 1720, which is configured to send, at the candidate transmission position of the synchronized signal block, the corresponding synchronized signal block to UE if the LBT result of the channel indicates that the channel is idle.

The time domain transmission unit includes: 1 slot, 2 slots or 1 millisecond.

The LBT module 1710 includes a first LBT submodule. The first LBT submodule is configured to perform LBT at first M microseconds of the time domain transmission unit where a candidate transmission position of the synchronized signal block is located or at last N microseconds of a previous time domain transmission unit, to obtain the LBT result of the channel; where the M and the N are positive integers.

Values of the M and the N are 16 or 25.

The LBT module 1710 further includes a second LBT submodule. The second LBT submodule is configured to perform LBT at first P time domain symbols of the time domain transmission unit where a candidate transmission position of the synchronized signal block is located or at last Q time domain symbols of a previous time domain transmission unit, to obtain the LBT result of the channel; where P and Q are positive integers.

When a subcarrier spacing corresponding to the synchronized signal block is 15 KHz, values of P and Q are 1; when the subcarrier spacing corresponding to the synchronized signal block is 30 KHz, the values of P and Q are greater than or equal to 2; when the subcarrier spacing corresponding to the synchronized signal block is 120 KHz, the values of P and Q are greater than or equal to 3; when the subcarrier spacing corresponding to the synchronized signal block is 240 KHz, the values of P and Q are greater than or equal to 6.

The candidate transmission position of the synchronized signal block is located after a reserved transmission position of a physical downlink control channel, and the candidate transmission position includes: one or more consecutive transmission positions, other than the reserved transmission position of the physical downlink control channel, in a current time domain transmission unit.

The network device further includes a second sending module. The second sending module is configured to send a channel reservation signal to the UE at the reserved transmission position of the physical downlink control channel.

When there is no transmission position of a physical downlink control channel in the time domain transmission unit where the candidate transmission position of the synchronized signal block is located, the candidate transmission position includes: one or more consecutive transmission positions, other than the LBT position, in the time domain transmission unit.

The time domain transmission unit includes at least two candidate transmission positions of the synchronized signal block.

The network device further includes a third sending module. The third sending module is configured to, when there is other transmission position between two candidate transmission positions in the time domain transmission unit, send a channel reservation signal to the UE at the other transmission position between the two candidate transmission positions.

The first sending module includes a first sending submodule. The first sending submodule is configured to, if the LBT result of the channel indicates that the channel is idle, send, at the candidate transmission position of the synchronized signal block, the corresponding synchronized signal block to the UE after a preset transient period.

It should be noted that, the network device according to the embodiment of the present disclosure performs LBT at the time domain transmission unit where a candidate transmission position of the synchronized signal block is located, to determine whether the time domain transmission unit is available, and sends the corresponding synchronized signal block when the channel is available, to solve the problem of transmission of the synchronized signal block caused by the uncertain available time of the unlicensed band channel, so that a smooth performance of processes such as the initial access of UE and the RRM measurement is ensured.

In order to better achieve the above objective, the embodiment of the present disclosure further provides a network device. The network device includes a processor, a storage and a computer program stored in the storage and executable by the processor. The processor is configured to execute the computer program, to implement steps of the foregoing method of transmitting information in an unlicensed band. The embodiment of the present disclosure further provides a computer readable storage medium storing therein a computer program. The computer program is configured to be executed by a processor, to implement steps of the foregoing method of transmitting information in an unlicensed band.

Figure 18:
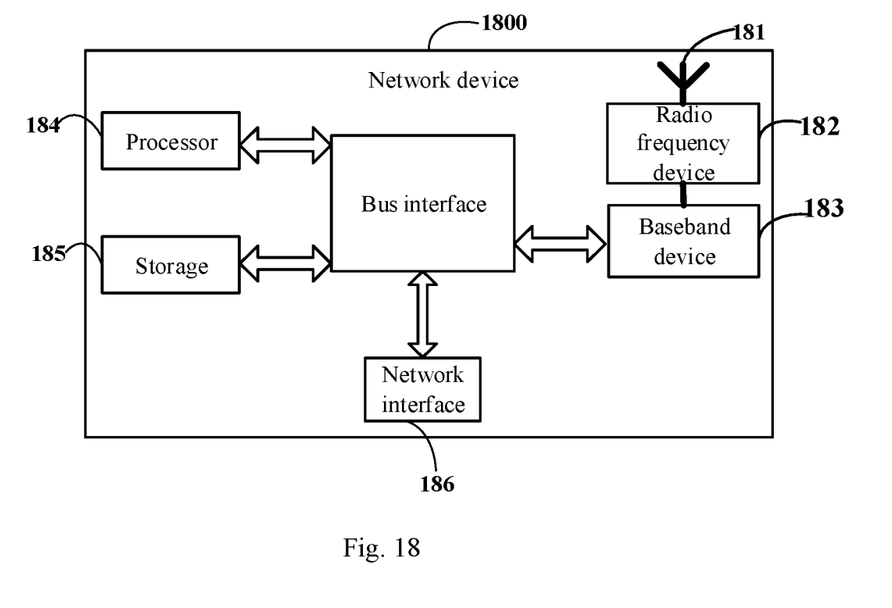
FIG. 18 is a block diagram illustrating a network device according to an embodiment of the present disclosure.

Specifically, the embodiment of the present disclosure further provides a network device. As shown in FIG. 18, the network device 1800 includes: an antenna 181, a radio frequency device 182, and a baseband device 183. The antenna 181 is connected to the radio frequency device 182. In an uplink direction, the radio frequency device 182 receives information via the antenna 181 and sends the received information to the baseband device 183 for processing. In a downlink direction, the baseband device 183 processes the information to be sent and send the information to the radio frequency device 182, and the radio frequency device 182 processes the received information and then transmit the information via the antenna 181.

The frequency band processing device may reside in the baseband device 183. The method performed by the network device according to the above embodiments may be implemented in the baseband device 183, and the baseband device 183 includes a processor 184 and a storage 185.

The baseband device 183 may include, for example, at least one baseband board on which a plurality of chips are provided. As shown in FIG. 18, one of the chips is, for example, a processor 184. The processor 184 is connected to the storage 185 to call a program in the storage 185 to implement operations of the network device as shown in the above method embodiments.

The baseband device 183 may further include a network interface 186 which is configured to exchange information with the radio frequency device 182. The interface is, for example, a common public radio interface (CPRI).

The processor herein may refer to one processor or refer to multiple processing elements collectively. For example, the processor may be a CPU, an ASIC, or one or more integrated circuits configured to implement the methods performed by the network device, such as one or more digital signal processors (DSP), or one or more field programmable gate arrays (FPGA). The storage element may refer to a storage or refer to multiple storage elements collectively.

The storage 185 may be a volatile or non-volatile storage, or may include both. The non-volatile storage may be a read-only memory (ROM), a programmable ROM (PROM), an erasable PROM (EPROM), an electrically EPROM (EEPROM) or a flash memory. The volatile storage may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The storage 185 described herein is intended to include, but is not limited to, these and any other suitable types of storages.

Specifically, the network device according to the embodiment of the present disclosure further includes: a computer program stored in the storage 185 and executable on the processor 184, and the processor 184 calls a computer program in the storage 185 to implement the method performed by the modules as shown in FIG. 17

Specifically, when called by the processor 184, the computer program is configured to implement the following operation: when there is a synchronized signal block to be transmitted, performing LBT at an LBT position of a time domain transmission unit where a candidate transmission position of the synchronized signal block is located, to obtain an LBT result of a channel; sending, at the candidate transmission position of the synchronized signal block, the corresponding synchronized signal block to UE if the LBT result of the channel indicates that the channel is idle.

The time domain transmission unit includes: 1 slot, 2 slots or 1 millisecond.

When called by the processor 184, the computer program is configured to implement the following operation: performing LBT at first M microseconds of the time domain transmission unit where a candidate transmission position of the synchronized signal block is located or at last N microseconds of a previous time domain transmission unit, to obtain the LBT result of the channel; where the M and the N are positive integers.

Values of the M and the N are 16 or 25.

When called by the processor 184, the computer program is configured to implement the following operation: performing LBT at first P time domain symbols of the time domain transmission unit where a candidate transmission position of the synchronized signal block is located or at last Q time domain symbols of a previous time domain transmission unit, to obtain the LBT result of the channel; where P and Q are positive integers.

When a subcarrier spacing corresponding to the synchronized signal block is 15 KHz, values of P and Q are 1; when the subcarrier spacing corresponding to the synchronized signal block is 30 KHz, the values of P and Q are greater than or equal to 2; when the subcarrier spacing corresponding to the synchronized signal block is 120 KHz, the values of P and Q are greater than or equal to 3; when the subcarrier spacing corresponding to the synchronized signal block is 240 KHz, the values of P and Q are greater than or equal to 6.

The candidate transmission position of the synchronized signal block is located after a reserved transmission position of a physical downlink control channel, and the candidate transmission position includes: one or more consecutive transmission positions, other than the reserved transmission position of the physical downlink control channel, in a current time domain transmission unit.

When called by the processor 184, the computer program is configured to implement the following operation: sending a channel reservation signal to the UE at the reserved transmission position of the physical downlink control channel.

When there is no transmission position of a physical downlink control channel in the time domain transmission unit where the candidate transmission position of the synchronized signal block is located, the candidate transmission position includes: one or more consecutive transmission positions, other than the LBT position, in the time domain transmission unit.

The time domain transmission unit includes at least two candidate transmission positions of the synchronized signal block.

When called by the processor 184, the computer program is configured to implement the following operation: when there is other transmission position between two candidate transmission positions in the time domain transmission unit, sending a channel reservation signal to the UE at the other transmission position between the two candidate transmission positions.

When called by the processor 184, the computer program is configured to implement the following operation: if the LBT result of the channel indicates that the channel is idle, sending, at the candidate transmission position of the synchronized signal block, the corresponding synchronized signal block to the UE after a preset transient period.

The network device may be a base transceiver station (BTS) in the global system of mobile communication (GSM) or the code division multiple access (CDMA), or may be a NodeB (NB) in the wideband code division multiple access (WCDMA), or may also be an evolutional Node B (eNB or eNodeB) in the LTE, or a relay station or access point, or a base station in a future 5G network, etc., which is not limited herein.

The network device according to the embodiment of the present disclosure performs LBT at the time domain transmission unit where a candidate transmission position of the synchronized signal block is located, to determine whether the time domain transmission unit is available, and sends the corresponding synchronized signal block when the channel is available, to solve the problem of transmission of the synchronized signal block caused by the uncertain available time of the unlicensed band channel, so that a smooth performance of processes such as the initial access of UE and the RRM measurement is ensured.

The above embodiments introduces the method of transmitting information in the unlicensed band provided by the present disclosure from the perspective of the network device side. In the following embodiment, the method of transmitting information in the unlicensed band at the UE side will be further introduced with reference to the accompanying drawings.

Figure 19:
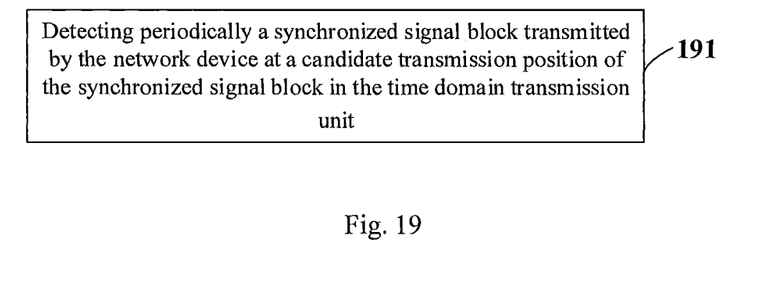
FIG. 19 is a schematic flow diagram illustrating a method of transmitting information in an unlicensed band at UE side according to an embodiment of the present disclosure.

As shown in FIG. 19, the method of transmitting information in the unlicensed band according to the embodiment of the present disclosure is applied to the UE side, and specifically includes the following step: step 191, detecting periodically a synchronized signal block transmitted by the network device at a candidate transmission position of the synchronized signal block in the time domain transmission unit.

The synchronized signal block is sent when the network device detects at the LBT position that the channel is idle. The LBT position includes: a first LBT position starting from the start of the time domain transmission unit where the candidate transmission position of the synchronized signal block is located, or, a second LBT position ending at the end of the time domain transmission unit previous to the time domain transmission unit where the candidate transmission position of the synchronized signal block is located. The first LBT position is the first M microseconds of the time domain transmission unit where the candidate transmission position of the synchronized signal block is located, and the second LBT position is the last N microseconds of the previous time domain transmission unit. Or, the first LBT position is the first P time domain symbols of the time domain transmission unit where the candidate transmission position of the synchronized signal block is located, and the second LBT position is the last Q time domain symbols of the previous time domain transmission unit. P and Q are positive integers.

Further, the time domain transmission unit includes at least two candidate transmission positions of the synchronized signal block.

In the method of transmitting information in the licensed band according to the embodiment of the present disclosure, the UE receives the synchronized signal block sent by the network device, so as to enable a smooth performance of processes such as the initial access and the RRM measurement.

The above embodiments describes the method of transmitting information in the unlicensed band in different scenarios, and the UE corresponding thereto is further introduced hereinafter with reference to the accompanying drawings.

Figure 20:
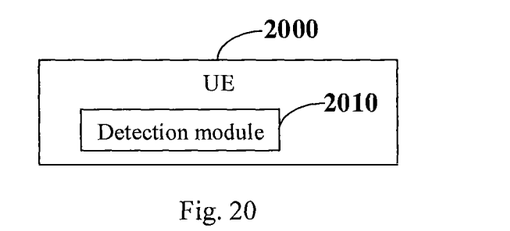
FIG. 20 is a schematic modular diagram of UE according to an embodiment of the present disclosure.

As shown in FIG. 20, the UE 2000 according to the embodiment of the present disclosure may implement the detail of the method according to the foregoing embodiment of detecting a synchronized signal block transmitted by the network device at a candidate transmission position of the synchronized signal block when the synchronized signal block is to be received, and achieve the same effect. The UE 2000 specifically includes the following functional module: a detection module 2010, which is configured to detect periodically a synchronized signal block transmitted by the network device at a candidate transmission position of the synchronized signal block in the time domain transmission unit.

It should be noted that, the UE according to the embodiment of the present disclosure receives the synchronized signal block sent by the network device, so as to enable a smooth performance of processes such as the initial access and the RRM measurement.

It is understood, the modular division of the network device and the UE is merely a logical function division, and in actual implementation the modules may be integrated entirely or partly on one physical entity or physically separated. These modules may be entirely implemented in form of software that may be called and executed by a processing element, or entirely implemented in form of hardware, or partly implemented in form of software that may be called and executed by a processing element and partly implemented in form of hardware. For example, a determination module may be a standalone processing element, or integrated in a chip of the device, or may be stored in a storage of the device in form of program code which is configured to be called by a processing element of the device to implement the function of the determination module. Other modules may be implemented in a similar way. In addition, the modules may be entirely or partly integrated together, or implemented separately. The described processing element may be an integrated circuit with signal processing capability. During an implementation process, steps of the methods or the modules may be realized in form of hardware by integrated logical circuits in the processing element, or in form of software by instructions.

For example, these modules may be one or more integrated circuits (IC) configured to implement the foregoing methods, e.g., one or more application specific integrated circuits (ASIC), one or more digital signal processors (DSP), or one or more field programmable gate arrays (FPGA), etc.

For another example, when a module is implemented in form of program code configured to be called by a processing element, the processing element may be a general purpose processor, e.g., a central processing unit (CPU) or other processor configured to call program code. For another example, these modules may be integrated together in form of a system-on-a-chip (SOC).

In order to better achieve the above objective, an embodiment of the present disclosure further provides UE, which includes a processor, a storage and a computer program stored in the storage and executable by the processor. The processor is configured to execute the computer program, to implement steps of the foregoing method of transmitting information in an unlicensed band. An embodiment of the present disclosure further provides a computer readable storage medium storing therein a computer program, where the computer program is configured to be executed by a processor, to implement steps of the foregoing method of transmitting information in an unlicensed band.

Figure 21:
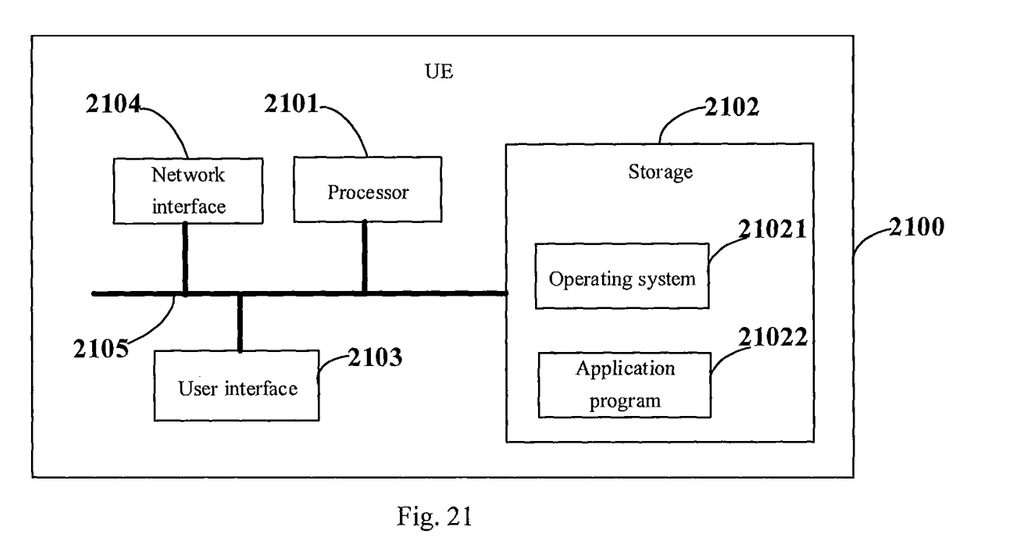
FIG. 21 is a block diagram of UE according to an embodiment of the present disclosure.

Specifically, FIG. 21 is a block diagram of UE 2100 according to another embodiment of the present disclosure. The UE shown in FIG. 21 includes at least one processor 2101, a storage 2102, a user interface 2103, and a network interface 2104. The various components in the UE 2100 are coupled together by a bus system 2105. It will be appreciated that the bus system 2105 is configured to enable connection communication between these components. The bus system 2105 includes a power bus, a control bus, and a status signal bus in addition to a data bus. However, for clarity of description, various buses are all labeled as the bus system 2105 in FIG. 21.

The user interface 2103 may include a display or a point-and-click device (e.g., a touchpad) or a touch screen, etc.

It is to be understood that the storage 2102 in the embodiment of the present disclosure may be a volatile or non-volatile storage, or may include both. The non-volatile storage may be a read-only memory (ROM), a programmable ROM (PROM), an erasable PROM (EPROM), an electrically EPROM (EEPROM) or a flash memory. The volatile storage may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The storage 2102 of the systems and methods described herein is intended to include, but is not limited to, these and any other suitable types of storages.

In some embodiments, the storage 2102 stores the following elements: executable modules or data structures, or a subset or extended set thereof, such as an operating system 21021 and an application program 21022.

The operating system 21021 includes various system programs, such as a framework layer program, a core library layer program and a driver layer program, to implement various basic services and process hardware-based tasks. The application program 21022 includes various application programs, such as a media player and a browser, to implement various application services. A program implementing the methods of the present disclosure may be included in the application program 21022.

In the embodiment of the present disclosure, the UE 2100 further includes: a computer program stored in the storage 2102 and executable by the processor 2101, and specifically, the computer program may be a computer program in the application program 21022. The computer program is configured to be executed by the processor 2101, to implement the following step: detecting periodically a synchronized signal block transmitted by the network device at a candidate transmission position of the synchronized signal block in the time domain transmission unit.

The method disclosed in the embodiments of the present disclosure may be applied to the processor 2101 or implemented by the processor 2101. The processor 2101 may be an integrated circuit chip having a signal processing capability. During an implementation process, steps of the methods may be realized in form of hardware by integrated logical circuits in the processor 2101, or in form of software by instructions. The processor 2101 may be a general purpose processor, digital signal processor (DSP), application specific integrated circuit (ASIC), field programmable gate array (FPGA) or other programmable logic device, discrete gate or transistor logic device, discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may reside in well-established storage medium in the art, such as a RAM, flash memory, ROM, PROM or EEPROM, register. The storage medium resides in the storage 2102. The processor 2101 reads information from the storage 2102 and performs the steps of the methods with its hardware.

It is understood, the embodiments described in the present disclosure may be implemented by hardware, software, firmware, middleware, microcode or a combination thereof. For hardware implementation, processing units may be implemented in one or more application specific integrated circuits (ASIC), digital signal processor (DSP), DSP device (DSPD), programmable logic device (PLD), field programmable gate array (FPGA), general purpose processor, controller, microcontroller, microprocessor, other electronic unit configured to perform the function described in this application or a combination thereof.

For software implementation, the technical solution described in the embodiments of the present disclosure may be implemented by a module (e.g., process, function, etc.) configured to perform the function described in the embodiments of the present disclosure. Software code may be stored in a storage and executed by the processor. The storage may be implemented internal or external to the processor.

The UE may be a wireless terminal or a wired terminal. The wireless terminal may refer to a device that provides voice and/or other service data connectivity to the user, a handheld device having a wireless connecting function, or other processing device connected to a wireless modem. The wireless terminal may communicate with one or more core networks via a radio access network (RAN), and the wireless terminal may be a mobile terminal, such as a mobile phone (or referred to as "cellular" phone) and a computer having a mobile terminal, for example, a portable, pocket-sized, handheld, computer built-in or in-vehicle mobile device that exchanges voice and/or data with the radio access network. For example, it may be a personal communication service (PCS) telephone, cordless telephone, session initiation protocol (SIP) telephone, wireless local loop (WLL) station, personal digital assistant (PDA) or the like. The wireless terminal may also be referred to as a system, a subscriber unit, a subscriber station, a mobile station, a mobile, a remote station, a remote terminal, an access terminal, a user terminal, a user agent, a user device or user equipment, and is not limited herein.

The UE of the embodiment of the present disclosure receives the synchronized signal block sent by the network device, so as to enable a smooth performance of processes such as the initial access and the RRM measurement.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If a function is implemented in form of software functional unit and sold or used as an independent product, it may be stored in a computer-readable storage medium. Based on such an understanding, essential part or the part contributing to the prior art of the technical solutions of the present disclosure, or a part of the technical solutions may be implemented in form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that may store program code, such as a universal serial bus (USB) flash drive, a mobile hard disk, an ROM, an RAM, a magnetic disk, or an optical disc.

Further, it is noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other. It is appreciated by a person of ordinary skill in the art that, all or any steps or components of the method and apparatus of the present disclosure may be implemented in form of hardware, firmware, software or a combination thereof in any computing device (including a processor, storage medium or the like) or a network of computing devices, which may be realized by a person of ordinary skill in the art, having read the description of the present disclosure, using basic programing skills.

Therefore, the objective of the present disclosure may further be achieved by running a program or a group of programs on any computing device. The computing device may be a well-known general-purpose device. Thus, the objective of the present disclosure may further be achieved by providing a program product including program codes configured to implement the method or apparatus. In other words, such a program product constitutes the present disclosure, and a storage medium storing such a program product also constitutes the present disclosure. Obviously, the storage medium may be any well-known storage medium or any storage medium to be developed in the future. It is also noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A method of transmitting information in an unlicensed band, applied to a network device side, comprising:
    performing listen before talk (LBT) at each candidate transmission position of a synchronized signal block until an LBT result of a channel indicates that the channel is idle, wherein the synchronized signal block comprises a New Radio primary synchronized signal (NR-PSS), a New Radio secondary synchronized signal (NR-SSS) and a New Radio physical broadcast channel (NR-PBCH) signal;
    sending, at the candidate transmission position of the synchronized signal block within a time domain transmission unit where the channel is idle, the corresponding synchronized signal block to user equipment (UE) if the LBT result of the channel indicates that the channel is idle, wherein the time domain transmission unit comprises at least two candidate transmission positions of the synchronized signal block.

2. The method according to claim 1, wherein the time domain transmission unit comprises: 1 slot, 2 slots or 1 millisecond.

3. The method according to claim 1, wherein the performing LBT at each candidate transmission position of the synchronized signal block comprises:
performing LBT at first M microseconds of the time domain transmission unit where the candidate transmission position of the synchronized signal block is located or at last N microseconds of a previous time domain transmission unit; wherein the M and the N are positive integers.

4. The method according to claim 3, wherein values of the M and the N are 16 or 25.

5. The method according to claim 1, wherein the performing LBT at each candidate transmission position of the synchronized signal block comprises:
performing LBT at first P time domain symbols of the time domain transmission unit where the candidate transmission position of the synchronized signal block is located or at last Q time domain symbols of a previous time domain transmission unit; wherein the P and the Q are positive integers.

6. The method according to claim 5, wherein,
when a subcarrier spacing corresponding to the synchronized signal block is 15 KHz, the P and the Q are 1;
when the subcarrier spacing corresponding to the synchronized signal block is 30 KHz, the P and the Q are greater than or equal to 2;
when the subcarrier spacing corresponding to the synchronized signal block is 120 KHz, the P and the Q are greater than or equal to 3;
when the subcarrier spacing corresponding to the synchronized signal block is 240 KHz, the P and the Q are greater than or equal to 6.

7. The method according to claim 1, wherein, the candidate transmission position of the synchronized signal block is located after a reserved transmission position of a physical downlink control channel, and the candidate transmission position comprises: at least two consecutive transmission positions, other than the reserved transmission position of the physical downlink control channel, within a current time domain transmission unit.

8. The method according to claim 7, further comprising:
sending a channel reservation signal to the UE at the reserved transmission position of the physical downlink control channel.

9. The method according to claim 1, wherein, when there is an other transmission position between two candidate transmission positions in the time domain transmission unit, the method further comprises:
sending a channel reservation signal to the UE at the other transmission position between the two candidate transmission positions.

10. The method according to claim 1, wherein the sending, at the candidate transmission position of the synchronized signal block within a time domain transmission unit where the channel is idle, the corresponding synchronized signal block to the UE if the LBT result of the channel indicates that the channel is idle comprises:
if the LBT result of the channel indicates that the channel is idle, sending, at the candidate transmission position of the synchronized signal block, the corresponding synchronized signal block to the UE after a preset transient period.

11. A network device, comprising a processor, a storage and a computer program stored in the storage and executable by the processor, wherein, the processor is configured to execute the computer program, to implement following steps:
performing listen before talk (LBT) at each candidate transmission position of a synchronized signal block until LBT result of a channel indicates that the channel is idle, wherein the synchronized signal block comprises a New Radio primary synchronized signal (NR-PSS), a New Radio secodary synchronized signal (NR-SSS) and a New Radio physical broadcast channel (NR-PBCH) signal;
sending, at the candidate transmission position of the synchronized signal block within a time domain transmission unit where the channel is idle, the corresponding synchronized signal block to user equipment (UE) if the LBT result of the channel indicates that the channel is idle, wherein the time domain transmission unit comprises at least two candidate transmission positions of the synchronized signal block.

12. A non-transitory computer readable storage medium storing therein a computer program, wherein the computer program is configured to be executed by a processor, to implement steps of the method of transmitting information in the unlicensed band according to claim 1.

13. The network device according to claim 11, wherein the time domain transmission unit comprises: 1 slot, 2 slots or 1 millisecond.

14. The network device according to claim 11, wherein the processor is configured to execute the computer program, to further implement following step:
performing LBT at first M microseconds of the time domain transmission unit where the candidate transmission position of the synchronized signal block is located or at last N microseconds of a previous time domain transmission unit; wherein the M and the N are positive integers.

15. The network device according to claim 11, wherein the processor is configured to execute the computer program, to further implement following step:
performing LBT at first P time domain symbols of the time domain transmission unit where the candidate transmission position of the synchronized signal block is located or at last Q time domain symbols of a previous time domain transmission unit; wherein the P and the Q are positive integers.

16. The network device according to claim 11, wherein, the candidate transmission position of the synchronized signal block is located after a reserved transmission position of a physical downlink control channel, and the candidate transmission position comprises: at least two consecutive transmission positions, other than the reserved transmission position of the physical downlink control channel, within a current time domain transmission unit.

17. The network device according to claim 11, wherein the processor is configured to execute the computer program, to further implement following step:
if the LBT result of the channel indicates that the channel is idle, sending, at the candidate transmission position of the synchronized signal block, the corresponding synchronized signal block to the UE after a preset transient period.

* * * * *